(12) United States Patent
Davis et al.

(10) Patent No.: US 7,530,691 B1
(45) Date of Patent: May 12, 2009

(54) OPHTHALMIC LENSES FOR CORRECTION OF ABERRATION AND PROCESSES FOR PRODUCTION OF THE LENSES

(75) Inventors: Brett Davis, Mt. Gravatt East (AU); Khaled Chehab, Jacksonville, FL (US); Ross Franklin, Jacksonville, FL (US); Michael Collins, Jolly's Lookout (AU)

(73) Assignee: J&J Vision Care, Jacksonville, FL (US)

( * ) Notice: Subject to any disclaimer, the term of this patent is extended or adjusted under 35 U.S.C. 154(b) by 0 days.

(21) Appl. No.: 12/023,331

(22) Filed: Jan. 31, 2008

(51) Int. Cl.
*G02C 7/02* (2006.01)
*G02C 7/04* (2006.01)
*G06F 7/60* (2006.01)

(52) U.S. Cl. ............... 351/177; 351/160 R; 351/160 H; 703/2

(58) Field of Classification Search ............. 351/160 R, 351/160 H, 177; 703/2
See application file for complete search history.

(56) References Cited

U.S. PATENT DOCUMENTS

| 5,807,381 | A | 9/1998 | Liberman |
| 6,305,802 | B1 | 10/2001 | Roffman et al. |
| 6,406,145 | B1 * | 6/2002 | Jubin .......................... 351/177 |

* cited by examiner

*Primary Examiner*—Scott J Sugarman

(57) ABSTRACT

The invention provides a lens useful in correction of low and high order ocular wavefront aberrations order aberrations, and methods for designing and producing the lens, in which excessive variations in lens thickness are minimized.

14 Claims, No Drawings

OPHTHALMIC LENSES FOR CORRECTION OF ABERRATION AND PROCESSES FOR PRODUCTION OF THE LENSES

FIELD OF THE INVENTION

The invention relates to ophthalmic lenses. In particular, the invention provides lenses that correct optical aberrations.

BACKGROUND OF THE INVENTION

Correction of refractive errors using contact lenses is well known. Conventional contact lenses provide correction for low order optical aberrations, such as defocus and astigmatism, leaving higher order aberrations uncorrected. Recently, contact lenses for correction of higher order aberrations have been disclosed as well. Typically, low and high order ocular aberrations are measured as departures from a spherical wavefront at any position on the wavefront. To correct the aberrations, the geometry of one or more surfaces of the lens is designed to compensate for the departures from the spherical wavefront.

Some individuals have ocular conditions including, without limitation, keratoconus, irregular astigmatism, corneal dystrophies, and ocular trauma that produce more extreme aberrations than in the population at large. Additionally, even for those individuals without such ocular conditions, the compensating geometry necessary for correction may be such that data to describe the entire diameter of the optic zone is not available. Also, one or both of the optic zone and lens edge may have areas of excessive variations in thickness. In each of these scenarios, the variations result in a lens that may be difficult to manufacture and the variations can make the lens uncomfortable on-eye.

DETAILED DESCRIPTION OF THE INVENTION AND PREFERRED EMBODIMENTS

The invention provides a lens useful in correction of low and high order ocular wavefront aberrations, and methods for designing and producing the lens, in which substantially no excessive variations in lens thickness at the edge of the optic zone results from the extrapolation of the aberrations from the original measured diameter of aberration data to the desired optic zone diameter. The lenses and method of the invention may find particular utility in providing lenses for individuals with highly aberrated eyes.

In a first embodiment, the invention provides a method for designing and ophthalmic lens comprising, consisting essentially of, and consisting of: a.) acquiring wavefront aberration data for an eye of an individual having a first diameter; b.) extrapolating the aberration data to second diameter; and c.) applying a mathematical filter to each meridian of the extrapolated aberration data to reduce excessive variations in thickness of a lens surface. In another embodiment, the invention provides a lens designed in accordance with this method.

For purposes of the invention, by "excessive variation" is meant a variation between the minimum and maximum thickness around the circumference of the optic zone at the edge of the optic zone of 100 or more microns. The edge of the optic zone is the diameter of the optic zone immediately adjacent to the lens' peripheral zone, or the non-optical zone surrounding the optic zone. Typically, the edge of the optic zone will be about 100 microns to about 1 mm in width.

For purposes of the invention, thickness at any given point on the lens is measured in terms of the distance between the front, or object side, surface and back, or eye side, surface of the lens along a direction orthogonal to the back surface.

In the first step of the method of the invention, the wavefront aberrations of an individual are measured. Apparatuses for performing the aberration measurements include, without limitation, wavefont sensors, aberroscopes, devices that measure Optical Transfer Function by point spread or line spread, or any similar devices that measure, estimate, interpolate, or calculate the ocular optical wavefront, wavefront errors or aberrations. Suitable measuring devices are commercially available from, for example, Wavefront Sciences, Inc, Albuquerque, N. Mex. Correction for the aberrations will be provided by calculation of a lens surface geometry that provides the required optical path difference that offsets the distortions due to the ocular aberrations.

Low and high order ocular aberrations, generally, are any departure from a spherical wavefront at any position on the wavefront. The classic description of these aberrations are spherical aberration, defocus, astigmatism, coma, and distortion. Alternatively, the aberrations may be represented by mathematical descriptors. Examples of such descriptors include Zernike polynomials, surface fitting functions including, without limitation, Taylor series polynomials, and the like. Preferably, Zernike polynomials are used in the method of the invention. From the Zernike polynomials, the wavefront aberrations may be reconstructed at Cartesian or polar coordinates.

In a second step of the method of the invention, the aberration data is extrapolated to a second diameter. In a preferred embodiment, the data is extrapolated to a diameter that is substantially equal to that of an optic zone of a contact lens and more preferably, the extrapolation is carried out using Zernike polynomials. Thus, the extrapolation calculations may be performed over a diameter substantially corresponding to the diameter of the optic zone of the lens surface, which is typically between about 6.5 to 9 mm and preferably is about 8 mm. Preferably, the calculations are performed at a diameter that is increased in comparison to the optic zone diameter to allow for any offset alignment between the aberration data center at the pupil center and that of the contact lens surface's optic zone. The increase in diameter preferably is at least twice the offset distance. For example, if the offset alignment value is 0.35 mm, the extrapolation diameter preferably is 0.7 mm larger than the optic zone diameter. More preferably, the increase is about 0.3 to about 0.7 mm.

It is a discovery of the invention that excessive variations in lens thickness may result from the extrapolation of wavefront aberration data to a larger diameter. It is a further discovery of the invention that these excessive variations may be reduced by applying a mathematical filter to the extrapolated aberration in each meridian.

Suitable filters are those capable of filtering the extrapolated aberrations to give smooth, continuous data, reducing excessive variations in the extrapolated region, and allowing surface functions to approximate the aberrations across the extrapolated diameter without producing significant errors within the original aberration data diameter. Optionally, in those cases in which the variations in thickness are still undesirable after filtering, the optic zone diameter may be reduced, preferably in 0.2 mm increments, until the thickness variations are acceptable.

In one embodiment, the filter used may be a cosine form, such as a Hamming Window that is applied to the differences between the aberration amplitude between consecutive points in each meridian. In using the Hamming method, the change in aberrations is defined according to the following equation:

$$\Delta z = z_n - z_{n-1} \quad (I)$$

wherein z is the aberration amplitude;

n is a first point in a meridian; and n−1 is a second point in the meridian.

The resulting $\Delta z$ value is then multiplied by the Hamming Window to generate a second $\Delta z$. The Hamming Window is a value, y, multiplied as follows:

$$\text{Hamming Window} = 0.54 - 0.46 \cos\left[2\pi \frac{xPoint}{xRange}\right] \quad (II)$$

wherein:

xPoint is a distance from the original aberration data semi-diameter to a point; and xRange is the distance between the original aberration data semi-diameter and the final extrapolation semi-diameter.

Each of the second values for $\Delta z$ are then summed along the meridian to generate the aberration data in the extrapolation region. It is preferred to complete each data meridian out as far as the extrapolated semi-diameter and to keep the sampling at 200 microns or less.

Examples of other functions that may be used for purposes of filtering include:

$$\text{Hanning Window} = 0.5x\left[1 - \cos\left(2\pi \frac{xPoint}{xRange}\right)\right] \quad (III)$$

Yet another example is:

$$\text{Parzen Window} = 1 - \left|\frac{xPoint - 0.5 * xRange}{0.5 * xRange}\right| \quad (IV)$$

Still another example is:

$$\text{Blackman Window} = \quad (V)$$
$$0.42 - 0.50 \cos\left[2\pi \frac{xPoint}{xRange}\right] + 0.08 \cos\left[4\pi \frac{xPoint}{xRange}\right]$$

A still further example is:

$$\text{Welch Window} = 1 - \left(\frac{(xPoint - 0.5 * xRange)}{(0.5 * xRange)}\right)^2 \quad (VI)$$

The preferred filter is the Hamming Window because it results in fewer fit errors after extrapolation than do the other filters. One ordinarily skilled in the art will recognize that other signal processing window functions that are typically used for Fast Fourier Transform data may be used.

The filtered data may be transformed onto a grid pattern of a rectilinear, polar concentric, or spiral format to correspond to the mechanism by which the surface of a lens or lens mold may be tooled using a computer numeric controlled ("CNC") lathe, direct machining of a polymer button, milling, laser ablation, injection molded insert or the like or a combination thereof. The required changes in the lens' surface elevation or slope to achieve correction of the aberrations may be incorporated onto the lens' front surface, back surface, or be divided between the front and back surface. In preferred embodiments, the back surface is matched to the wearer's corneal topography.

For lenses incorporating an inverse topographic elevation map of the lens wearers' cornea, the corneal topography may be determined by any known method including, without limitation, by use of a corneal topographer. The data then may be mapped onto a CNC grid pattern and used to make the lenses or mold tool surface.

Contact lenses useful in the invention may be either hard or soft lenses. Soft contact lenses, made of any material suitable for producing such lenses, preferably are used. The lenses of the invention may have any of a variety of corrective optical characteristics incorporated onto the surfaces in addition to aberration correction and distance and near optical powers, such as, for example, cylinder power.

The contact lenses of the invention may be formed by any conventional method. For example, the annular zones formed therein may produced by diamond-turning using alternating radii. The zones may be diamond-turned into the molds that are used to form the lens of the invention. Subsequently, a suitable liquid resin is placed between the molds followed by compression and curing of the resin to form the lenses of the invention. Alternatively, the zones may be diamond-turned into lens buttons.

What is claimed is:

1. A method for designing an ophthalmic lens, comprising: a.) acquiring original wavefront aberration data for an eye of an individual having a first diameter; b.) extrapolating the aberration data to second diameter; and c.) applying a mathematical filter to each meridian of the extrapolated aberration data to reduce excessive variations in thickness of a lens surface.

2. The method of claim 1, wherein the second diameter substantially corresponding to or greater than the diameter of an optic zone of a contact lens.

3. The method of claim 1, wherein the filter is selected from the group consisting of a Hamming Window, a Hanning Window, a Parzen Window, a Blackman Window, and a Welch Window.

4. The method of claim 2, wherein the filter is selected from the group consisting of a Hamming Window, a Hanning Window, a Parzen Window, a Blackman Window, and a Welch Window.

5. The method of claim 1, wherein step c.) is carried out by (i) defining a change in the original aberration data according to the following equation:

$$\Delta z = z_n - z_{n-1}$$

wherein z is the aberration amplitude;

n is a first point in a meridian; and n−1 is a second point in the meridian;

(ii) multiplying the resulting $\Delta z$ value by a Hamming Window:

$$\text{Hamming Window} = 0.54 - 0.46 \cos\left[2\pi \frac{xPoint}{xRange}\right]$$

wherein:

xPoint is a distance from an original aberration data semi-diameter to a point; and xRange is the distance between the original aberration data semi-diameter and the final extrapolation semi-diameter; and (iii) summing the second values of $\Delta z$ along the meridian.

6. The method of claim 2, wherein step c.) is carried out by (i) defining a change in the original aberration data according to the following equation:

$$\Delta z = z_n - z_{n-1}$$

wherein z is the aberration amplitude;
n is a first point in a meridian; and
n−1 is a second point in the meridian;

(ii) multiplying the resulting $\Delta z$ value by a Hamming Window:

$$\text{Hamming Window} = 0.54 - 0.46 \cos\left[2\pi \frac{xPoint}{xRange}\right]$$

wherein:

xPoint is a distance from an original aberration data semi-diameter to a point; and xRange is the distance between the original aberration data semi-diameter and the final extrapolation semi-diameter; and (iii) summing the second values of $\Delta z$ along the meridian.

7. The method of claim 2, further comprising transforming the filtered data into a form suitable for tooling a surface of a lens or a lens mold.

8. A lens produced by the method of claim 1.
9. A lens produced by the method of claim 2.
10. A lens produced by the method of claim 3.
11. A lens produced by the method of claim 4.
12. A lens produced by the method of claim 5.
13. A lens produced by the method of claim 6.
14. A lens produced by the method of claim 7.

* * * * *